(12) United States Patent
Abrego et al.

(10) Patent No.: US 7,035,789 B2
(45) Date of Patent: Apr. 25, 2006

(54) SUPERVISED AUTOMATIC TEXT GENERATION BASED ON WORD CLASSES FOR LANGUAGE MODELING

(75) Inventors: Gustavo Hernandez Abrego, Sunnyvale, CA (US); Xavier Menendez-Pidal, Los Gatos, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 862 days.

(21) Appl. No.: 09/947,114

(22) Filed: Sep. 4, 2001

(65) Prior Publication Data

US 2003/0046078 A1  Mar. 6, 2003

(51) Int. Cl.
G06F 17/27 (2006.01)
G06F 17/20 (2006.01)
G06F 17/21 (2006.01)

(52) U.S. Cl. ................. 704/9; 704/1; 704/10
(58) Field of Classification Search .......... 704/9, 704/255, 245
See application file for complete search history.

(56) References Cited

U.S. PATENT DOCUMENTS

| | | | |
|---|---|---|---|
| 6,178,396 B1 * | 1/2001 | Ushioda ................. | 704/1 |
| 6,606,597 B1 * | 8/2003 | Ringger et al. .......... | 704/270 |
| 2002/0116173 A1 * | 8/2002 | Ratnaparkhi ............ | 704/9 |

OTHER PUBLICATIONS

Ward, Wayne, Issar, Sunil. "A Class Based Language Model for Speech Recognition", Acoustics, Speech and Signal Processing, IEEE Conference on, vol. 1, May 7-10, 1996, pp. 416-418.*

Niesler, T.R., Woodland, P.C., "A Variable-Length Category-Based N-Gram Language Model", Acoustics, Speech and Signal Processing, IEEE Conference on, vol. 1, May 7-10, 1996, pp. 164-167.*

Placeway, P.; Schwartz, R.; Fung, P.; Nguyen, L.; "The estimation of powerful language models from small and large corpora", Acoustics, Speech, and Signal Processing, 1993. IEEE International Conference on ,vol.: 2, Apr. 27-30, 1993, pp. 33-36. □□.*

Niesler, T.R., Whittaker, E.W.D, Woodland, P.C., "Comparison of Part-of-Speech and Automatically Derived Category-Based Language Models for Speech Recognition", Acoustics, Speech and Signal Processing, IEEE Conference on, vol. 1, May 12-15, 1998, 177-180.*

(Continued)

Primary Examiner—W. R. Young
Assistant Examiner—Matthew J Sked
(74) Attorney, Agent, or Firm—Mikio Ishimaru

(57) ABSTRACT

A system and method is provided that randomly generates text with a given structure. The structure is taken from a number of learning examples. The structure of training examples is captured by word classification and the definition of the relationships between word classes in a given language. The text generated with this procedure is intended to replicate the information given by the original learning examples. The resulting text may be used to better model the structure of a language in a stochastic language model.

22 Claims, 2 Drawing Sheets

OTHER PUBLICATIONS

Brown, Peter; deSouza, Peter; Mercer, Robert: Della Pietra, Vincent; Lai, Jenifer. "Class-Based n-gram Models of Natural Language", Computational Linguistics 18(4), 467-479, Dec. 1992.*

Wakita, Yumi; Kawai, Jun; Iida, Hitoshi. "An Evaluation of Statistical Language Modeling for Speech Recognition Using a Mixed Category of Both Words and Parts-of-Speech", Spoken Language, 4th International Conference, vol. 1, Oct. 3-6, 1996.*

Masataki, Hirokasu; Sgisaka, Yoshinori. "Variable-Order N-Gram Generation by Word-Class Splitting and Consecutive Word Grouping", Acoustics, Speech and Signal Processing, IEEE Conference on, vol. 1, May 7-10, 1996, pp. 188-191.*

Blasig, Reinhard. "Combination of Words and Word Categories in Varigram Histories", Acoustics, Speech and Signal Processing, IEEE Conference on, vol. 1, Mar. 15-19, 1999, pp. 529-532.*

Yamamoto, H. Isogai, S. Sagisaka, Y. "Multi-Class Composite N-gram Language Model for Spoken Language Processing Using Multiple Word Clusters", 39th Meeting on Association for Computational Linguistics 2001, pp. 531-538.*

Philip Clarkson and Ronald Rosenfeld, "Statistical Language Modeling Using the CMU-Cambridge Toolkit", in *Proceedings Eurospeech '97*, Sep. 1997, pp. 2707-2710, published by International Speech Communication Association.

Kimmo Koskenniemi, "A General Computational Model For Word-Form Recognition And Production", in Proceedings of the 22nd annual meeting on Association for Computational Linguistics, 1984, pp. 178-181, published by Association for Computational Linguistics; Stanford, California, USA.

Masaru Tomita and See-Kiong Ng, "The Generalized LR Parsing Algorithm", in *Generalized LR Parsing*, 1991, pp. 1-16, published by Kluwer Academic Publishers; Norwell, Massachusetts, USA.

* cited by examiner

SUPERVISED AUTOMATIC TEXT GENERATION BASED ON WORD CLASSES FOR LANGUAGE MODELING

TECHNICAL FIELD

The present invention relates generally to speech recognition and more specifically to language modeling.

BACKGROUND ART

In the past, speech recognition was related to identifying single commands for voice-operated devices. Over time, this has evolved to being able to identify speech for many purposes including normal language commands and word processing. However, even now, the systems for speech recognition are far from perfect.

In continuous speech recognition, language modeling has demonstrated to add valuable information to the recognition process by substantially increasing recognition accuracy. The purpose of language modeling is to capture the structure of a language to build sentences out of words.

Among the several language modeling systems developed to date, stochastic language modeling based on N-grams has better performance in large vocabulary continuous speech recognition. N-grams are based in the estimation of the probability of a word to follow its given history of words. Such probabilities are to be estimated from a training database that contains sufficient examples of words in different context and histories. It is understood that the larger the history considered, the better the context in which a word occurs will be modeled. However, the longer the history, the larger the number of learning examples required to capture all the possible word combinations that precede a given word.

This shortage of learning examples is a major obstacle for all language modeling systems and has heretofore prevented them from achieving even a portion of their full potential.

Third order N-grams, or sets of three words called "tri-grams", are used in most of the large vocabulary continuous speech applications as providing a good trade-off between history reach and number of examples needed to represent such history.

Nevertheless, even for tri-grams it is still difficult to provide sufficient training examples. Many of the actual word histories are always not present in the training data and are left unseen in the probability estimation. Those skilled in the art have tried, without complete success, to alleviate this data sparsity by using discounting and smoothing strategies that allow inclusion of an estimation of the probabilities of unseen histories or events in the language model.

However, the existing data sparsity problem still continues to cause major problems. For example, given a vocabulary of 100 words, the total number of possible tn-grains is 100×100×100=1,000,000. Which means tax, in order to be able to model all the 3-word histories and context of 100 words, at least one million examples are needed. Further, the need of learning examples grows exponentially with the increment of words in the vocabulary even though all words tat happen in all possible contexts, and not all histories, are valid. Limited training examples are only capable of adding information to a language model up to their capacity limit. Thereafter, statistical techniques for estimation from sparse data need to be used. This presents a major roadblock with regard to providing adequate training to improve the language models and, as a result, the accuracy of speech recognition systems.

For large vocabularies, the number of learning examples needed to train an N-gram is phenomenally huge. It is usually next to impossible to find enough text examples to train all the N-grams even in large, but limited, text databases. The text of the training database has to be directly related with the kind of N-grams that are to be learned. It is common that N-grams are trained for a given environment or application, such as medical, legal, sports, etc. Hence, the training text needs to be related to that application in order to be effective.

Those having expert skill in the art have long struggled with this problem of data sparsity, and equally as long have been unsuccessful in achieving a definitive solution.

DISCLOSURE OF THE INVENTION

The present invention provides a system and method that artificially and randomly generates text wit a given word structure for use by language modeling systems. The structure is taken from a number of learning examples. The structure of the training examples is captured by word classification and the definition of the relationships between word classes in a given language. A huge number of learning examples of ten are randomly generated which replicates the information given by the original learning examples. The resulting text is used to better model the structure of a language in stochastic language models and solves the problem of data sparsity by providing adequate and enough training examples to improve the accuracy of speech recognition recognition systems.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
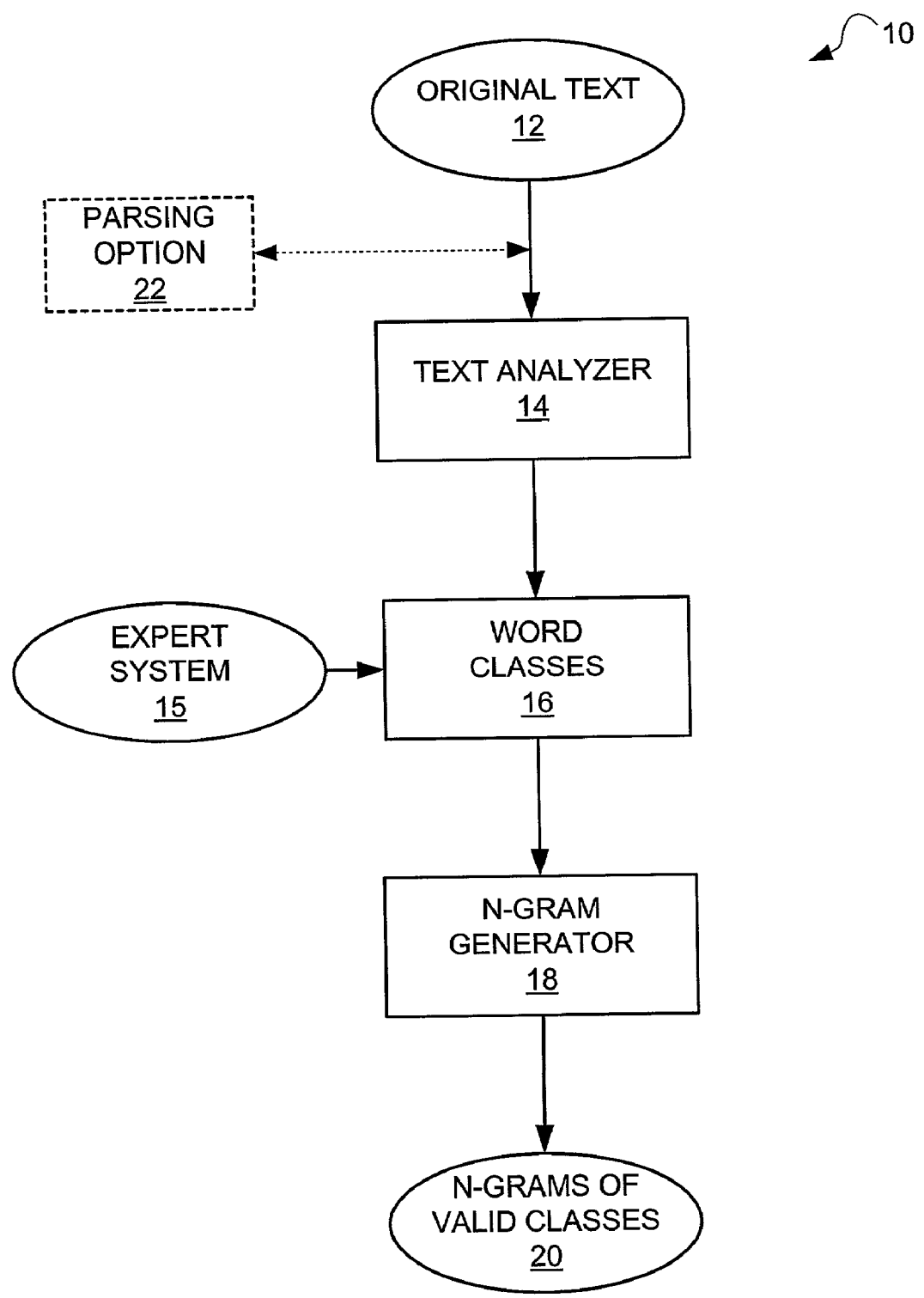
FIG. 1 is the is the text analysis system in accordance with the present invention.

Referring now to FIG. 1, therein is shown a text analysis system 10 of a supervised automatic text generation system for producing an N-gram of classes.

First, original text 12, in a language for which a speech recognition system is to be developed, is analyzed in a text analyzer 14. The text analyzer 14 decomposes the input original text 12 into words and analyzes the roles tat the words play in the sentences of the language.

The text analyzer 14 may be a morpho-syntactic analyzer and a description of such an analyzer can be found in "Two-level Morphology: a general computational model for word-form recognition and production" by Koskenniemi, K., University of Helsinki, Department of General Linguistics, Publication 11, 1983, which is incorporated herein by reference thereto.

The output of the text analyzer 14 provides the nature of each word (noun, verb, etc), a key of its meaning, taken from a thesaurus, and a hint of its role in the phrase.

An example of the output of the morpho-syntactic analyzer might be:

"we" PRON "hear" VERB "music" NOUN
"you" PRON "drink" VERB "tea" NOUN

The above text has been formatted for reading convenience from the actual output from the morpho-syntactic analyzer. Each of the words in the sentence normally appears followed by an attribute related to its syntactic role in the phrase.

The nature and role of each word in the original text 12 from the text analyzer 14 and the relationships between word classes from a conventional expert system 15 are used to create word classes 16.

Word classes 16 are needed because it is necessary to be able to handle different words more consistently and accurately than just the original text words themselves. Moreover, the word classes 16 allow the inclusion of new words that were not included into the original text 12 to appear in the resulting text; i.e., the present invention easily accommodates an expansion in vocabulary.

For instance, if the class "noun-building" is defined and only "house" and "office" are defined into this class, this restricts the nature of the examples to be generated. By adding elements to that class, different kinds of examples can be made. For example, if the word "church" is added to the class, it is possible to generate new examples that contain the new word.

In the specific example of the output of the morpho-syntactic analyzer of the text analyzer 14, words that share attributes can be clustered together in one class so that the following word classes can be built:
1. PRON {"we" "you"}
2. VERB {"hear" "drink"}
3. NOUN {"music" "tea"}

By combining such classes, and, later, by substituting their words into them, new text examples can be built such as:
   "you" PRON "hear" VERB "music" NOUN
   "we" PRON "drink" VERB "tea" NOUN However, the way the combination is performed has to be restricted and this supervision is accomplished by the expert system 15. In the example above, only the sequence of word classes PRON VERB NOUN is allowed. Any other sequence of classes will bring confusing results and nonsense phrases, which will not be of value in a language model. Moreover, in the sentences generated above, not every word substitution is valid. For instance, given the valid class sequence PRON VERB NOUN, the sequence of words is still not valid:
   "you" PRON "drink" VERB "music" NOUN
   "we" PRON "hear" VERB "tea" NOUN From the above, it is clear that the combination of classes to build sequences of classes, and to ultimately form sequences of words, is not a completely random issue. Some restrictions to class concatenation and word substitution need to be made. In order to restrict both the nature of the strings of classes and the words capable of being substituted in each, N-grams of valid classes needs to be generated.

The N-grams of valid classes is generated in an N-gram generator 18. The N-gram generator 18 is of a type which is well known in language modeling for speech recognition and is described in the paper "Statistical Language Modeling Using the CMU-Cambridge Toolkit" by Philip Clarkson and Ronald Rosenfeld found in the Proceedings Eurospeech '97, Rhodes Greece, pp 2707–2710, which is incorporated herein by reference thereto.

It is important to notice that the resulting N-grams from the N-gram generator 18 are not word N-grams but instead class N-grams. The N-grams of valid classes 20 produces estimations of the probability that a class will follow its given history or sequence in an N-gram; i.e., how likely a sequence of classes are to be valid. High probabilities indicate that, if the original text 12 were converted into sequences of classes, the N-gram of the sequence would be present, and therefore the N-gram would be valid. Conversely, low probabilities indicate that the N-gram would not be present and the N-gram would be invalid. The N-grams of classes 20 govern the word class concatenation.

The order (contextual reach) of the N-grams of classes 20 might be adjusted for each application (e.g., medical, legal, sport, etc.). In the present example, the order is set to be a tri-gram (N=3). It is important to notice that in English (as it happens in several other languages), a given word can belong to several classes. This is not a problem for the N-gram generator 18 because a word might be included in more than one class without disrupting the classification. However, the ambiguity of words, and the different role they play in language, causes problems to a system that captures the relationships between words. For instance, in the example above, the word "drink" may have two roles, verb or noun:
   "you" PRON "drink" NOUN "tea" NOUN
   "you" PRON "drink" VERB "tea" NOUN Given the context in which the word "drink" appears, it is clear that the valid sense for it is VERB. If this ambiguity is not solved, the sequence of classes PRON NOUN NOUN will also be allowed. For the learning examples given, the sequence of classes PRON NOUN NOUN is clearly incorrect.

To deal with ambiguity of this sort, a parsing option 22 can be used to parse the sentences of the original text 12. This parsing may be automatic or not. For purposes of the present invention, the learning examples do not present ambiguity because the parsing option 22 has been used to eliminate it. The need of parsed examples in the original text 12 to avoid ambiguity is a requisite for the N-gram generator 18.

A description of how parsing is implemented is found in "The Generalized LR Parsing Algorithm" by Tomita, M. and See-Kiong, N. published in the book "Generalized LR Parsing" Tomita, M (editor), pp. 1–16, Kluwer Academic Publishers, 1991, which is incorporated herein by reference thereto.

Figure 2:
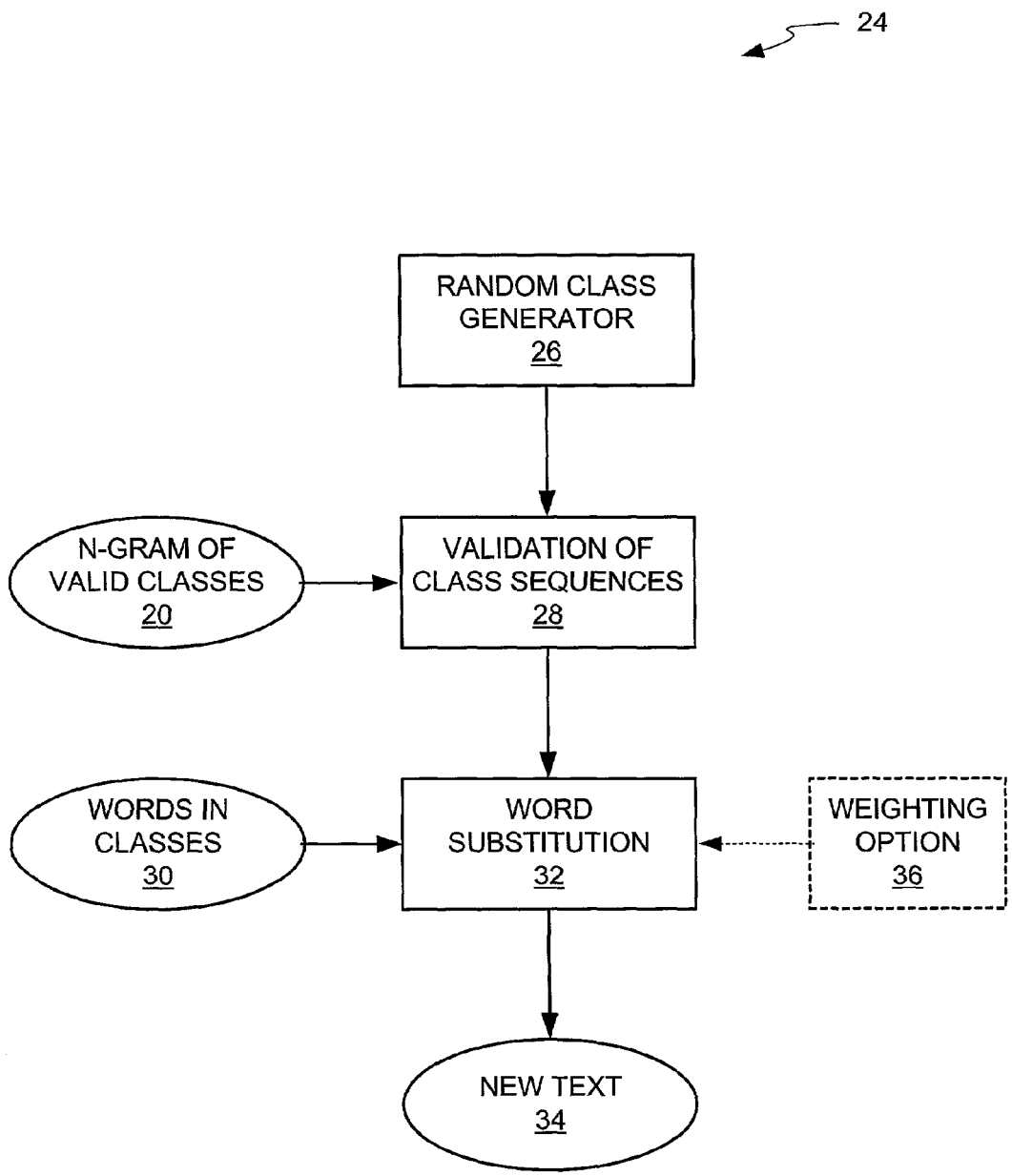
FIG. 2 is the text generation system in accordance with the present invention.

Referring now to FIG. 2, therein is shown a text generation system 24, which together with the text analysis system 10 form the supervised automatic text generation system.

The text generation system 24 has a random class generator 26, which is used to generate random length strings of classes and random sequences of classes in the random length strings.

The random length strings of classes are provided to a validation of classes 28. In the validation of classes 28, each class sequentially in the string is the starting point for a group of sequential classes. The groups are tested to determine if the sequences of classes in each group are one of the valid sequences of classes from the N-grams of valid classes 20. The valid groups are output as valid sequences of classes and the invalid groups discarded.

The addition of a new class to the string defines a new partial string. If the string or the partial string is a valid sequence of classes, the string or partial string is validated and the process continues iteratively until reaching the end of the string. The next string is then processed in the same manner.

This iterative process leads to random length, valid strings which contain valid sequences of classes. If a tri-gram is used, such strings will be valid in triplets but not necessarily valid for the whole length of the string. However, the resulting text will be valid for the purposes of training language models of orders equal or less than the order of the N-gram of classes.

It should be noted that, up to this point, the whole automatic text generation process has been performed using word classes instead of the words themselves. The resulting valid class sequences are random in nature, but the N-gram generator 18 of FIG. 1 has supervised the generation of the resulting class sequence to mimic the class structure of the original text. Most importantly, because of the random class generator 26, the resulting sequences of classes are not copies of the original text.

Once the string of valid sequences of classes has been defined, a word is substituted for each class. The words for each class are contained in the words in classes 30. The words in classes 30 are listings of the different classes and the words, which fit into each class. In word substitution 32, the sequential classes in each string are replaced by words, which are appropriate for the class. This produces word strings, which are new text 34. The substitution of the words for the classes may be entirely random or weighted.

When the substitution is random, every word of the class has equal probability of being included into the final word string.

When it is weighted, for example, the frequency of the words of each class is computed so that the frequency of a given word in the final string is different from in the original text samples. For example, critical terms can be made to appear at a higher frequency to improve training.

The building of word sequences out of a class sequence is a process that can be repeated iteratively also. Thus, one sequence of classes may generate a number of different sequences of words.

This solves the sparsity of data problem because the amount of text generated is unlimited. While some of the word sequences will make no sense when the whole sentence is considered, the resulting word sequences present the same structure as the original text and make "partial" sense for speech recognition training purposes.

The system of the present invention is intended to learn the structure of the training examples and to replicate it in order to build an unlimited number of new training examples, all of them related to the original text, in a text generation fashion. In such a way, the system can be seen as a "text booster" whose input is a limited set of original text examples and whose output is an unlimited set of new text of the same nature.

In summary, the supervised automatic text generation system of the present invention uses mechanisms based on word classes. Such classes are built from the text analyzer 14 that decomposes the input text samples into words and analyzes the role that words play in the sentences of the samples. Words with the same roles are gathered together into word classes 16. From the learning examples, the relationships between the words classes 16 are provided from an expert system. With the set of classes and their relationships, random valid class sequences of random length are created. Words, which fit into each of the classes, are then substituted into the class sequences to create new text 34. The system uses two major steps:

First, text analysis used to build classes from words and to learn the interaction between such classes.

Second, text generation uses the information learned in the previous step to randomly generate new examples that contain the same structure as the original text.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hitherto-fore set forth herein or shown in the accompanying drawings are to be interpreted in an illustrative and non-limiting sense.

The invention claimed is:

1. A method for use in supervised automatic text generation comprising:
   inputting an original text of a language;
   analyzing the original text to provide word classes;
   generating an N-gram of valid word classes using the word classes;
   generating string of random word classes;
   validating a group of word classes in the string of random word classes using the N-gram of the valid word classes;
   providing a word for words in classes;
   substituting the word in the group of word classes; and
   outputting new text in the language.

2. The method as claimed in claim 1 including:
   parsing the original text to eliminate word class ambiguities in the original text.

3. The method as claimed in claim 1 wherein:
   analyzing to original text includes:
      decomposing the original text into words,
      determining the roles of the words in the original text, and
      placing the words with the same roles into the word classes; and including:
   providing relationships between the word classes.

4. The method as claimed in claim 1 wherein:
   generating the string of random word classes, generates a random length string.

5. The method as claimed in claim 1 including:
   substituting a plurality of words in a class in the group of word classes includes weighting the frequency of substitution.

6. The method as claimed in claim 1 including:
   adding a new class to the string of random word classes to define a new partial string.

7. A method for use in supervised automatic text generation comprising:
   providing an N-gram of valid word classes;
   generating a string of random word classes;
   validating a group of word classes in the string of random word classes using the N-gram of valid word classes;
   providing a word in a language for words in classes;
   substituting the word in the class in the group of word classes; and
   outputting new text in the language.

8. The method as claimed in claim 7 wherein:
   generating the string of random word classes, generates a random length string.

9. The method as claimed in claim 7 including:
   substituting a plurality of words in a class in the group of word classes includes weighting the frequency of substitution.

10. The method as claimed in claim 7 including:
    adding a new class to the string of random word classes to define a new partial string.

11. A method for use in supervised automatic text generation comprising:
    inputting an original text of a language;
    analyzing the original text to provide word classes;

generating an N-gram of valid word classes using the word classes;
generating a string of random word classes;
validating a group of word classes in the string of random word classes using the N-gram of valid word classes;
providing a word for words in classes;
substituting the word in a word class in the group of word classes; and
outputting new text in the language.

12. In a supervised automatic text generation system, a system comprising:
   an input for inputting an original text of a language;
   a text analyzer for analyzing original text to provide word classes;
   an N-gram generator for generating an N-gram of valid word classes using the word classes;
   a random class generator for generating a string of random word classes;
   a validating mechanism for validating a group of word classes in the string of random word classes using the N-gram of the valid word classes;
   a word in classes mechanism for providing a word for words in classes;
   a substitution mechanism for substituting the word in the group of word classes; and
   an output for outputting new text in the language.

13. The system as claimed in claim 12 including:
   a parsing mechanism for parsing the original text to eliminate word class ambiguities in the original text.

14. The system as claimed in claim 12 wherein:
   the text analyzer includes:
      a first mechanism for decomposing the original text into words,
      a second mechanism determining the roles of the words in the original text, and
      a third mechanism placing the words with the same roles into the word classes; and including:
   an expert system for providing relationships between the word classes.

15. The system as claimed in claim 12 wherein:
   the random class generator generates a random length string.

16. The system as claimed in claim 12 wherein:
   the word in classes mechanism provides a plurality of words; and
   the substitution mechanism includes a mechanism for weighting the frequency of substitution.

17. The system as claimed in claim 12 including:
   a mechanism for adding a new class to the string of random word classes to define a new partial string.

18. In a supervised automatic text generation system, a system comprising:
   a random class generator for generating a string of random word classes;
   a validating mechanism for validating a group of word classes in the siring of random word classes using an N-gram of valid word classes;
   a word in classes mechanism for providing a word in a language for words in classes;
   a substitution mechanism substituting the word in the group of word classes; and
   an output for outputting new text in the language.

19. The system as claimed in claim 18 wherein:
   the random class generator generates a random length string.

20. The system as claimed in claim 18 wherein:
   the word in classes mechanism provides a plurality of words; and
   the substitution mechanism includes a mechanism for weighting the frequency of substitution.

21. The system as claimed in claim 18 including:
   a mechanism for adding a new class to the string of random word classes to define a new partial string.

22. In a supervised automatic text generation system, a system comprising:
   an input for inputting original text of a language;
   a text analyzer for analyzing the original text to provide word classes;
   an N-gram generator for generating an N-gram of valid word classes using the word classes;
   a random class generator for generating a string of random word classes;
   a validating mechanism for validating a group of word classes in the string of random word classes using the N-gram of valid word classes;
   a word in classes mechanism for providing a word for words in classes;
   a substitution mechanism for substituting the word in a word class in the group of word classes; and
   an output outputting new text in the language.

* * * * *

UNITED STATES PATENT AND TRADEMARK OFFICE
CERTIFICATE OF CORRECTION

PATENT NO. : 7,035,789 B2
DATED : April 25, 2006
INVENTOR(S) : Abrego et al.

It is certified that error appears in the above-identified patent and that said Letters Patent is hereby corrected as shown below:

Column 1,
Line 54, delete "tn-grains" and insert -- tri-grams --.
Line 55, delete "tax," and insert -- that, --.
Line 60, delete "tat," and insert -- that --.

Column 2,
Line 18, delete "wit" and insert -- with --.
Line 24, delete "ten" and insert -- text --.
Line 52, delete "tat" and insert -- that --.

Column 6,
Line 16, between "generating" and "string" insert -- a --.
Line 27, delete "to" and insert -- the --.

Column 7,
Line 37, begin "and including" on a new line.

Column 8,
Line 9, delete "siring" and insert -- string --.

Signed and Sealed this

Thirtieth Day of May, 2006

JON W. DUDAS
*Director of the United States Patent and Trademark Office*